US006558770B1

(12) United States Patent
Lehmann et al.

(10) Patent No.: US 6,558,770 B1
(45) Date of Patent: May 6, 2003

(54) PERFORATED WORK PIECE, AND METHOD FOR PRODUCING IT

(75) Inventors: Volker Lehmann, München (DE); Hans Reisinger, Grünwald (DE); Hermann Wendt, Grasbrunn (DE); Reinhard Stengel, Stadtbergen (DE); Gerrit Lange, München (DE); Stefan Ottow, Dresden (DE)

(73) Assignee: Infineon Technologies AG, Munich (DE)

( * ) Notice: Subject to any disclaimer, the term of this patent is extended or adjusted under 35 U.S.C. 154(b) by 167 days.

(21) Appl. No.: 09/708,277

(22) Filed: Nov. 8, 2000

Related U.S. Application Data

(63) Continuation of application No. PCT/DE99/01292, filed on May 3, 1999.

(30) Foreign Application Priority Data

May 8, 1998 (DE) ........................................ 198 20 756

(51) Int. Cl.[7] .................................................. B32B 3/24

(52) U.S. Cl. ....................... 428/138; 428/131; 428/688; 205/665

(58) Field of Search ................................ 428/138, 131, 428/688; 205/665

(56) References Cited

U.S. PATENT DOCUMENTS

| | | | | | |
|---|---|---|---|---|---|
| 4,044,222 A | * | 8/1977 | Kestenbaum | .......... | 219/121.71 |
| 4,570,173 A | * | 2/1986 | Anthony et al. | ............ | 257/618 |
| 5,139,624 A | | 8/1992 | Searson et al. | | |
| 5,262,021 A | * | 11/1993 | Lehmann et al. | ........... | 205/655 |
| 5,403,752 A | | 4/1995 | Bruchhaus et al. | | |
| 5,997,713 A | * | 12/1999 | Beetz et al. | ................ | 205/124 |

FOREIGN PATENT DOCUMENTS

DE 44 26 507 A1 2/1996

* cited by examiner

*Primary Examiner*—William P. Watkins, III
(74) *Attorney, Agent, or Firm*—Laurence A. Greenberg; Werner H. Stemer; Ralph E. Locher

(57) ABSTRACT

A substrate made from silicon has a first region and a second region. Through pores are formed in the first region. Pores that do not traverse the substrate are provided in the second region. The production of the work piece is performed with the aid of electrochemical etching of the pores. The entire surface of the substrate is covered with a mask layer that is structured photolithographically on the rear of the substrate. The bottoms of the pores in the second region are etched clear, preferably using KOH.

9 Claims, 2 Drawing Sheets

PERFORATED WORK PIECE, AND METHOD FOR PRODUCING IT

CROSS-REFERENCE TO RELATED APPLICATION

This is a continuation of copending International Application PCT/DE 99/01292, filed May 3, 1999, which designated the United States.

BACKGROUND OF THE INVENTION

Field of the Invention

Perforated work pieces are required for various technical applications, in particular as cost-effective optical or mechanical filters with pore diameters in the micrometer or submicrometer range. Such applications are, inter alia, isoporous membranes, reversibly washable filters, laminators, catalyst supports, reagent supports, electrodes for batteries and fuel cells, nozzle plates, tube grids or filters for electromagnetic waves such as, for example, light or microwaves.

German Patent DE 42 02 454 C1 discloses a method for producing a perforated work piece which can be used to produce pore diameters in this region. In this method, electrochemical etching is used to form holes in and perpendicular to a first surface of a substrate wafer, made from n-doped monocrystalline silicon, so as to produce a structured layer. The electrochemical etching is performed in a fluoride-containing electrolyte in which the substrate is connected as an anode. When the holes reach a depth which corresponds essentially to the thickness of the finished work piece, the process parameters are changed such that the cross section of the holes increases, and the structured layer is detached as a platelet from which the work piece is formed.

Since the production requires that adjacent holes grow together, the shape of the perforated work piece produced corresponds to the shape of the substrate wafer. The perforated work piece is penetrated in this case continuously with pores as far as the edge. This limits the mechanical strength of the perforated work piece.

SUMMARY OF THE INVENTION

It is accordingly an object of the invention to provide a perforated work piece, and a method for producing it, which overcome the above-mentioned disadvantages of the prior art devices and methods of this general type, and has an increased mechanical strength.

With the foregoing and other objects in view there is provided, in accordance with the invention, a perforated work piece containing a substrate made from silicon and having a first region, a second region, a first main surface and a second main surface. The first region has pores formed therein that traverse the substrate from the first main surface to the second main surface. The second region has further pores formed therein which, starting from the first main surface, extend into the substrate but do not traverse the substrate.

The work piece has a substrate made from silicon in which the first region and the second region are provided. In the first region, the pores traverse the substrate from the first main surface to the second main surface. The work piece is perforated in the first region. In the second region, the pores are provided which, starting from the first main surface, extend into the substrate but do not traverse the substrate. As a result, a solid substrate material that increases the stability of the perforated work piece is present below the pores in the second region. The perforated work piece can therefore be mounted with a low risk of damage.

The thickness of the substrate in the direction of the depth of the pores is preferably greater in the second region than in the first region.

By providing a plurality of first regions, it is possible to define different filter regions, in particular for the application as a catalytic converter or a reagent support.

It is advantageous for the purpose of mounting the perforated work piece to provide the second region in an annular fashion, and to dispose the first region inside the second region. In this case, the solid edge acts in the second region as a frame for the perforated work piece.

In accordance with an added feature of the invention, in a region of the second main surface, the second region has an edge region having a surface with <111> orientation.

In accordance with another feature of the invention, the pores have a first depth and the further pores have a second depth substantially equal to the first depth of the pores, and the substrate is thicker in the second region in a direction of a pore depth than in the first region.

The perforated work piece is preferably produced with the use of electrochemical etching. For this purpose, the pores whose depth is less than the thickness of the substrate are produced in the first main surface of the substrate made from silicon by electrochemical etching. The first main surface and the surface of the pores, and the second main surface, which is opposite the first main surface, are provided with a mask layer. The mask layer is structured in the region of the second main surface such that the second main surface is exposed in the first region. Using a structured mask layer as an etching mask, the substrate is subsequently etched at least as far as the bottom of the pores in the region of the exposed second main surface. The mask layer is subsequently removed, so that the pores disposed in the first region traverse the substrate from the first main surface to the second main surface.

The mask layer is preferably formed from $Si_3N_4$ or $SiO_2$.

Etching of the substrate to form the penetrating pores in the first region is preferably performed with KOH. In the region of the second main surface, the result of this for the second region is an edge region having a surface with a <111>-orientation.

The electrochemical etching is preferably performed in a fluoride-containing acid electrolyte, the substrate being connected as an anode of an electrolytic cell. Since the substrate is connected as the anode, minority charge carriers move in the silicon to the first main surface, which is in contact with the electrolyte. A space charge zone is formed there. Since the field strength in the region of depressions in a surface is always greater than outside thereof, the minority charge carriers move preferentially to such depressions, which are present with a statistic distribution in every surface. This results in a structuring of the first main surface. The deeper an initially small irregularity becomes through etching, the more minority charge carriers move there because of the enlarged field strength, and the stronger the etching attack becomes at this point. The holes grow in the substrate in the crystallographic <100>-direction.

It is preferable to use an electrolyte with a concentration of between 2 percent by weight of HF and 10 percent by weight of HF. A voltage of between 1.5 volts and 3 volts is then applied during the electrochemical etching. This results in pores of 20 $\mu$m. The diameter of the holes is preferably 2 $\mu$m given a substrate doping of 5 $\Omega$cm.

It is advantageous for setting the current density in the substrate to illuminate the second main surface of the substrate during the electrochemical etching.

Other features which are considered as characteristic for the invention are set forth in the appended claims.

Although the invention is illustrated and described herein as embodied in a perforated work piece, and a method for producing it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
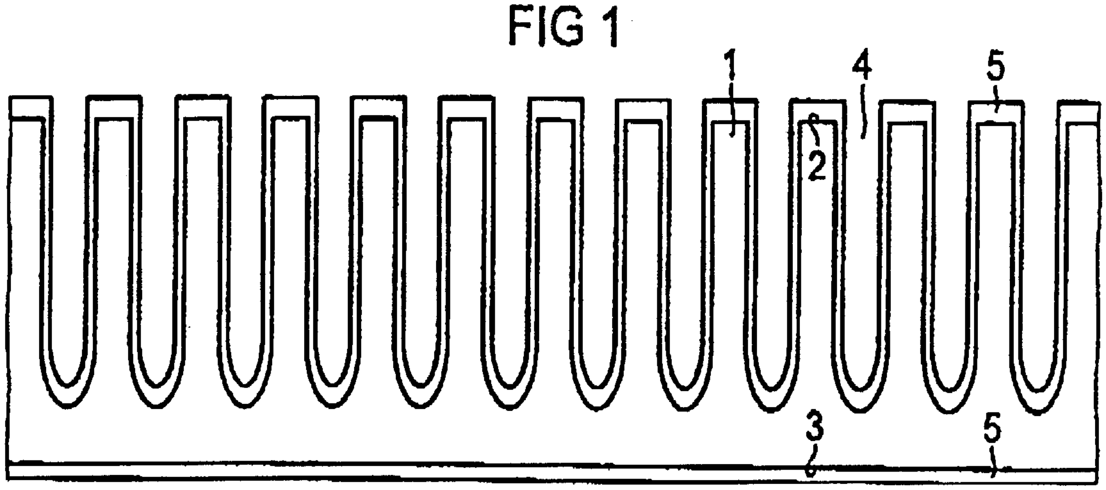
FIG. 1 is a diagrammatic, sectional view through a substrate that has pores emanating from a first main surface according to the invention.

In all the figures of the drawing, sub-features and integral parts that correspond to one another bear the same reference symbol in each case. Referring now to the figures of the drawing in detail and first, particularly, to FIG. 1 thereof, there is shown a substrate 1 made from n-doped, monocrystalline silicon with a resistivity of 5 ohms cm and is provided at a first main surface 2 with a surface topology. The surface topology contains depressions that are disposed at regular intervals and are produced using photolithographic process steps by an alkaline etching. Alternatively, the surface topology can be formed by optically induced, electrochemical etching.

The first main surface 2 of the substrate 1 is brought into contact with a fluoride-containing, acid electrolyte. The electrolyte has a hydrofluoric acid concentration of 2 to 10 percent by weight, preferably 5 percent by weight. An oxidizing agent, for example hydrogen peroxide, can be added to the electrolyte in order to suppress evolution of hydrogen bubbles on the first main surface 2 of the substrate 1.

The substrate 1 is connected as an anode. A voltage of 1.5 to 5 volts, preferably 3 volts, is applied between the substrate 1 and the electrolyte. The substrate 1 is illuminated with light on a second main surface 3, which is opposite the first main surface 2, such that a current density of 10 mA per $cm^2$ is set. Starting from the depressions, pores 4 that run perpendicular to the first main surface 2 (see FIG. 1) are produced during the electrochemical etching. After an etching time of 4.5 hours, the pores 4 reach a depth of 300 $\mu$m measured from the first main surface 2 in the direction of the pore depth, and a diameter of 2 $\mu$m. The spacing between adjacent pores 4 is 4 $\mu$m.

A mask layer 5 made from silicon nitride is formed with a thickness of 100 nm by chemical vapor deposition (CVD). The mask layer 5 covers both the first main surface 2 and the second main surface 3 and surfaces of the pores 4.

Figure 2:
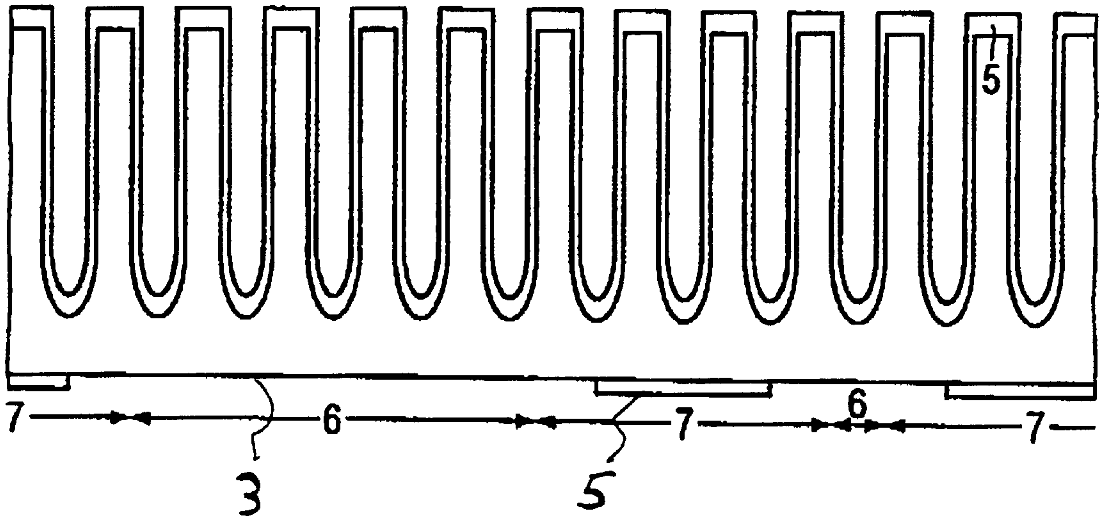
FIG. 2 is a sectional view through the substrate after structuring of a mask layer for the purpose of defining first regions and second regions.

With the aid of a photolithographically produced mask (not illustrated) and plasma etching with $CF_4$, $O_2$, the mask layer 5 is structured in a region of the second main surface 3 (see FIG. 2). This defines first regions 6 and second regions 7. The second main surface 3 is exposed in the first regions 6. The second main surface 3 is, furthermore, covered by the mask layer 5 in the second regions 7. The first main surface 2 and the surface of the pores 4 is likewise covered completely by the mask layer 5.

Figure 3:
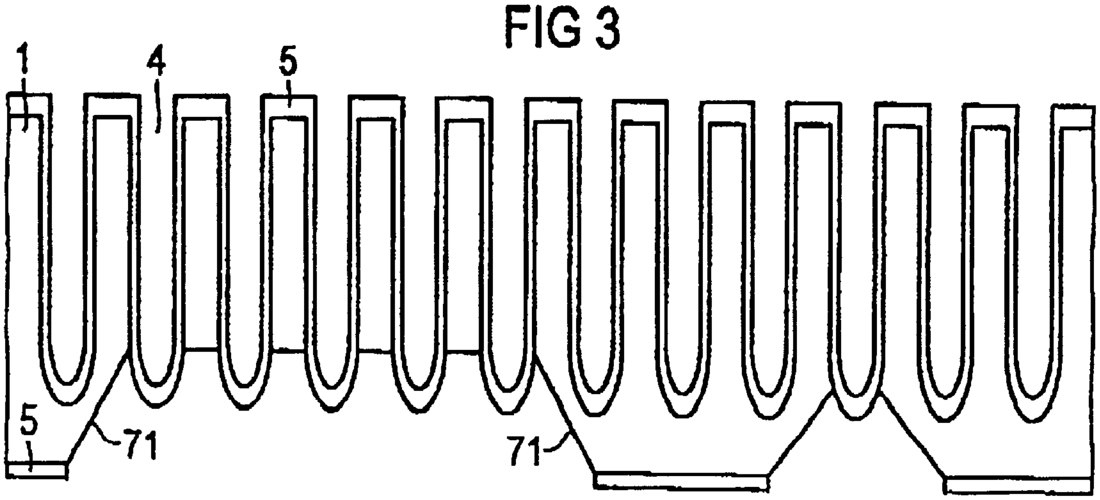
FIG. 3 is a sectional view through the substrate after etching the substrate as far as a bottom of the pores.

The substrate 1 is subsequently etched at least as far as a bottom of the pores 4 by etching with KOH at a concentration of 50 percent by weight. The etching of the substrate 1 is performed to a depth, measured from the second main surface 3, of 350 $\mu$m in conjunction with a substrate thickness of 625 $\mu$m. This exposes the surface of the mask layer 5 in the first regions 6 in the region of the bottom of the pores 4 (see FIG. 3). During the etching with KOH, the etching attack is performed along preferred crystallographic directions, with the result that edge regions 71 that have a surface with <111>-orientation are formed at an edge of the second regions 7.

Figure 4:
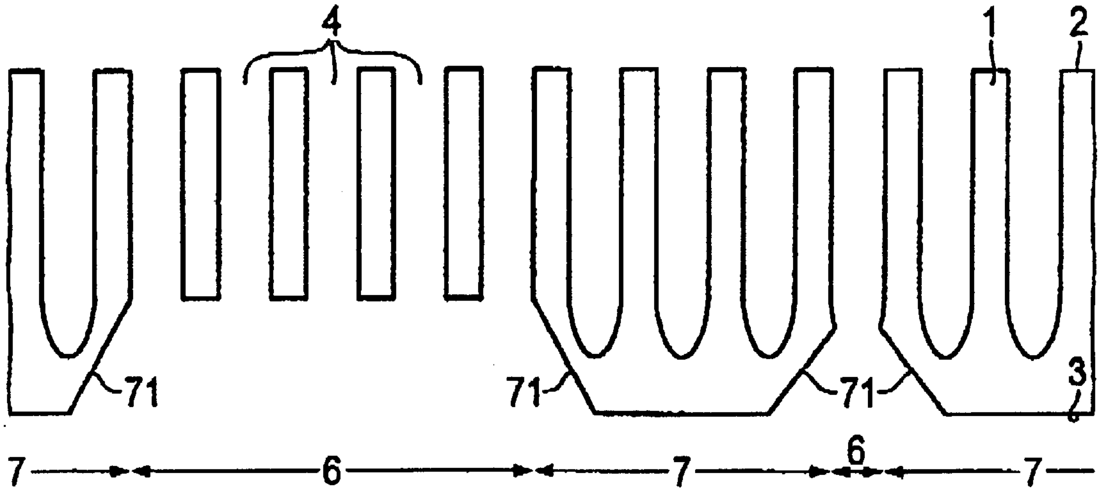
FIG. 4 is a sectional view through the substrate after removal of a mask layer.

Removing the mask layer 5 with 50 percent by weight of HF produces a perforated work piece that has penetrating pores 4 in the first regions 6 (see FIG. 4). The second regions 7, in which the pores 4 do not traverse the substrate 1, are adjacent to the first region 6. The second regions 7 provide stability for the perforated work piece.

Figure 5:
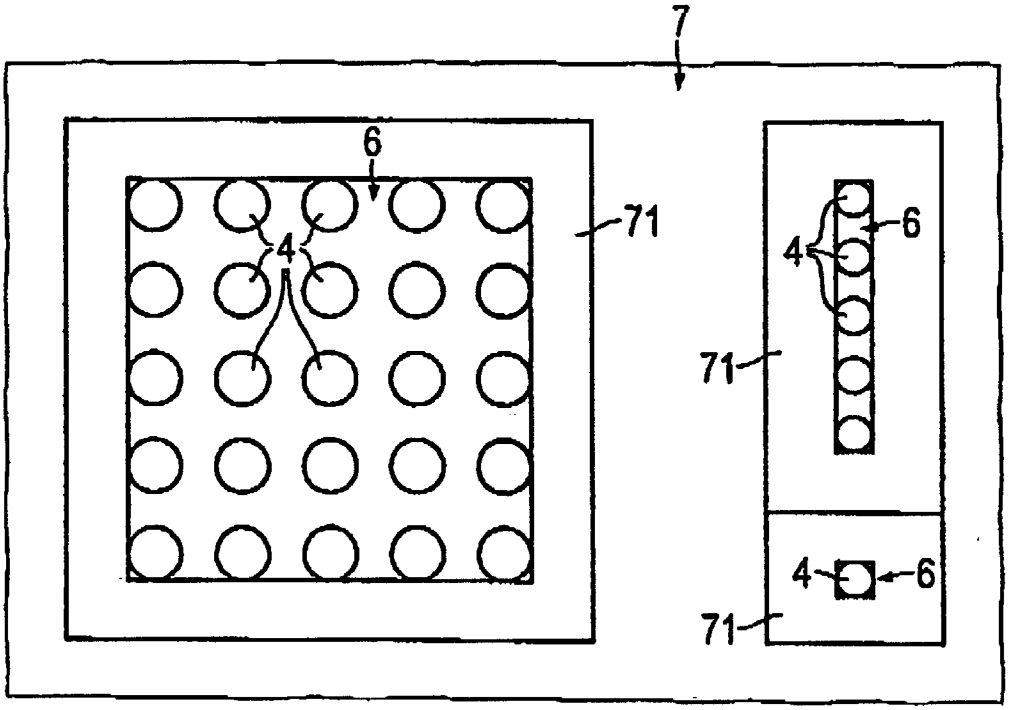
FIG. 5 is a plan view of a work piece illustrated in FIG. 4.

The first regions 6 have different shapes in different regions of the perforated work piece (see the plan view in FIG. 5). The first regions 6 can be of large area configuration, for example rectangular or square, with a multiplicity of pores, elongated with a row of pores, or square with only one pore. In a fashion governed by the etching with KOH to expose the bottoms of the pores 4 in the first region 6, the first region 6 is surrounded by the edge region 71 of one of the second regions 7. The geometrical shape of the second regions 7 is selected in accordance with the requirements placed on the stability. It corresponds, in particular, to webs, a grid, individual windows, a scribe line, or identification features.

The mask layer 5 can alternatively be formed by thermal oxidation from $SiO_2$.

We claim:

1. A perforated work piece, comprising:

a substrate made from silicon and having a first region, a second region, a first main surface and a second main surface, said first region having pores formed therein which traverse said substrate from said first main surface to said second main surface, and said second region having further pores formed therein which, starting from said first main surface, extend into said substrate but do not traverse said substrate.

2. The work piece according to claim 1, wherein in a region of said second main surface, said second region has an edge region having a surface with <111> orientation.

3. The work piece according to claim 1, wherein said pores have a first depth and said further pores have a second depth substantially equal to said first depth of said pores, and said substrate is thicker in said second region in a direction of a pore depth than in said first region.

4. A method for producing a perforated work piece, which comprises the steps of:

providing a substrate formed of silicon and having a first main surface, a second main surface opposite the first main surface, a first region, a second region, and a given thickness;

electrochemical etching pores in the first main surface of the substrate having a depth less than the given thickness of the substrate;

applying a mask layer to the first main surface, to a surface of the pores, and to the second main surface;

structuring the mask layer in a region of the second main surface such that the second main surface is exposed in the first region resulting in a structured mask layer;

etching the substrate at least as far as a bottom of the pores using the structured mask layer as an etching mask; and removing the mask layer such that the pores disposed in the first region traverse the substrate from the first main surface to the second main surface.

5. The method according to claim 4, which comprises forming the mask layer from $Si_3N_4$.

6. The method according to claim 4, which comprises performing the electrochemical etching of the substrate with KOH.

7. The method according to claim 4, which comprises performing the electrochemical etching in a fluoride-containing acid electrolyte, the substrate being connected as an anode of an electrolytic cell.

8. The method according to claim 7, which comprises:

providing the fluoride-containing acid electrolyte with a concentration of between 2 percent by weight of hydrofluoric acid and 10 percent by weight of the hydrofluoric acid; and applying a voltage of between 1.5 volts and 3 volts during the electrochemical etching.

9. The method according to claim 4, which comprises illuminating the second main surface of the substrate during the electrochemical etching for setting a current density in the substrate.

* * * * *